United States Patent
Hendry

(10) Patent No.: US 8,105,529 B1
(45) Date of Patent: Jan. 31, 2012

(54) HEATED INJECTION MOLDING SYSTEM AND METHOD

(75) Inventor: James Hendry, Brooksville, FL (US)

(73) Assignee: Bi Group Services Ltd (GB)

( * ) Notice: Subject to any disclaimer, the term of this patent is extended or adjusted under 35 U.S.C. 154(b) by 0 days.

(21) Appl. No.: 13/010,066

(22) Filed: Jan. 20, 2011

(51) Int. Cl.
*B29C 45/73* (2006.01)
*B29C 45/34* (2006.01)

(52) U.S. Cl. .......... 264/572; 264/328.16; 425/130; 425/548

(58) Field of Classification Search .......... 264/40.6, 264/328.16, 572; 425/143, 144, 548, 552, 425/130
See application file for complete search history.

(56) References Cited

U.S. PATENT DOCUMENTS

| | | | |
|---|---|---|---|
| 4,201,742 A * | 5/1980 | Hendry | 264/45.5 |
| 4,340,551 A * | 7/1982 | Wada et al. | 264/403 |
| 4,390,486 A * | 6/1983 | Hendry et al. | 264/45.5 |
| 4,442,061 A | 4/1984 | Matsuda et al. | |
| 4,474,717 A * | 10/1984 | Hendry | 264/45.5 |
| 4,662,835 A | 5/1987 | Fukuda et al. | |
| 4,824,732 A * | 4/1989 | Hendry et al. | 428/542.8 |
| 4,923,667 A * | 5/1990 | Sayer | 264/572 |
| 4,976,900 A * | 12/1990 | Tsutsumi | 264/39 |
| 6,290,882 B1 | 9/2001 | Maus et al. | |
| 2004/0180150 A1 | 9/2004 | Hirota et al. | |
| 2004/0232604 A1 | 11/2004 | Jordan et al. | |

* cited by examiner

*Primary Examiner* — Jill Heitbrink
(74) *Attorney, Agent, or Firm* — Brooks Kushman P.C.

(57) ABSTRACT

A system and method are provided for molding a solid plastic part utilizing a mold having at least a core portion and a cavity portion which define a mold cavity. With the mold closed, pressurized steam is circulated through the mold cavity to heat the interior surface of the mold cavity. Once the mold cavity surface has reached the desired temperature, the pressurized steam is vented. When the condensate has been sufficiently removed, a fluid plastic is injected into the mold to the mold cavity. A pressurized fluid is introduced in the mold through a port on the mold core portion to bias the part being formed into engagement with the mold cavity. Once the part is cooled sufficiently to be stable, the mold is opened and the part is removed.

24 Claims, 4 Drawing Sheets

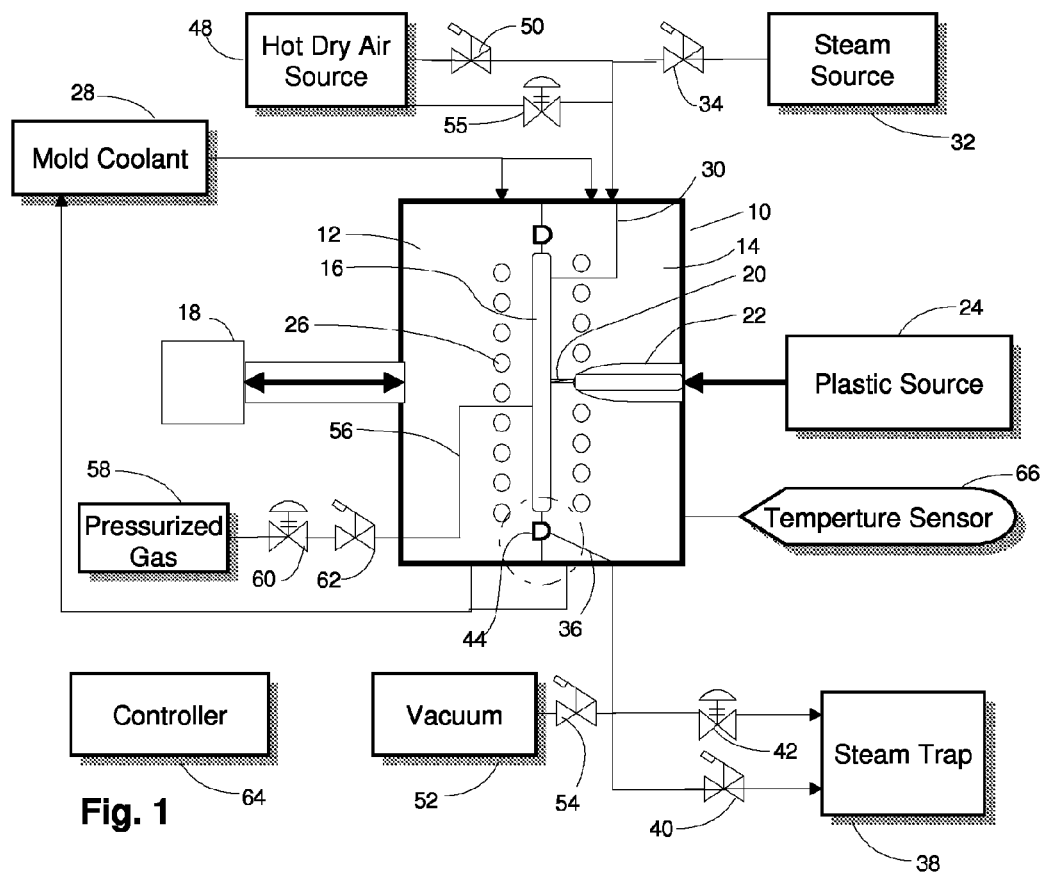
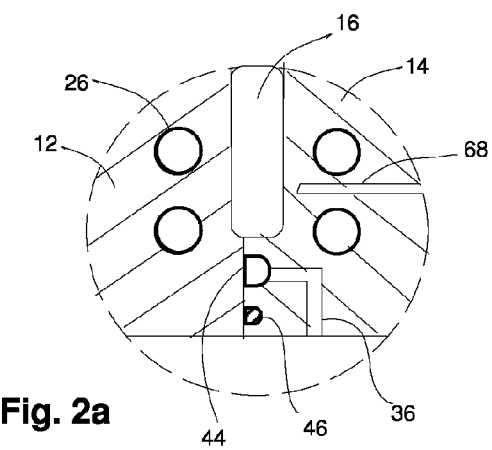
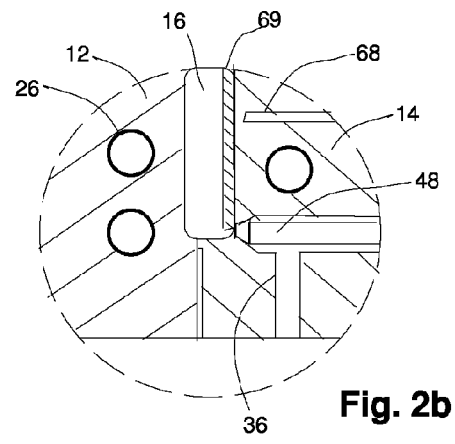

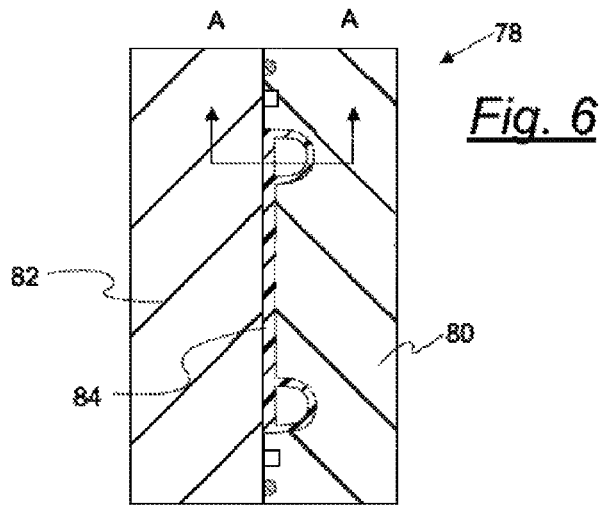
*Fig. 6*
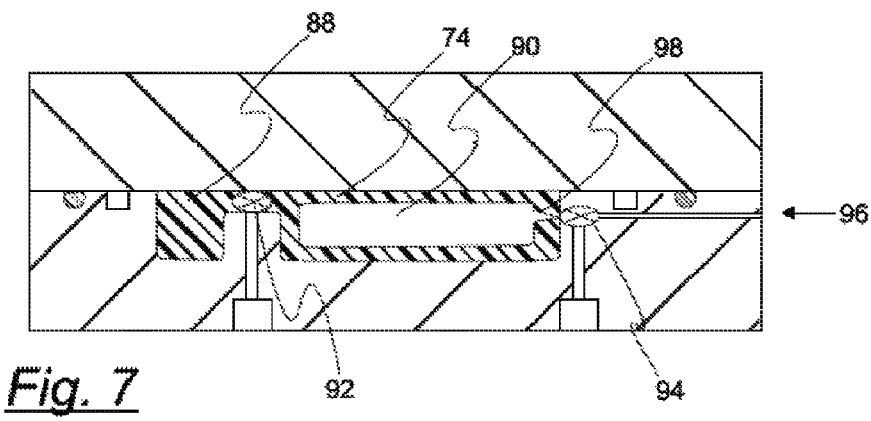
*Fig. 7*
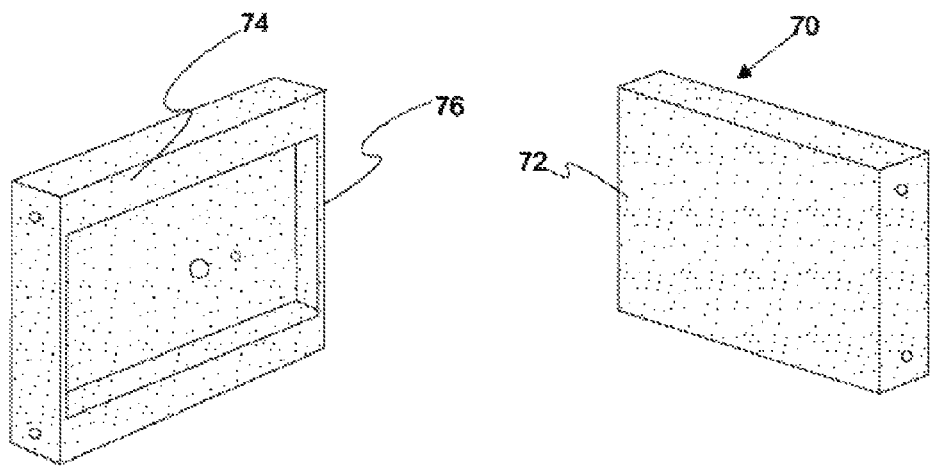
*Fig. 5b*  *Fig. 5a*

HEATED INJECTION MOLDING SYSTEM AND METHOD

BACKGROUND OF THE INVENTION

1. Field of the Invention

The present invention relates to plastic injection molding systems and methods for producing a high quality surface finish, with plastic and energy reductions.

2. Background Art

When injecting molding plastic parts in a closed mold, it is typically necessary to provide a liquid cooling system for the mold to cool the mold and the hot plastic injected into the cavity so that the part cools within a reasonable time period. If the part to be made has very thin sections, the plastic may be cooled too rapidly in the mold resulting in the formation of flow lines or knit lines in the part surface. If the thin part is provided with any locally thick sections such as mounting bosses, a dissimilar rate of cooling can result in sink marks on the appearance side of the part. In an effort to minimize flow marks in thin part sections, some manufacturers have actually heated the cavity portion of the mold by circulating hot liquid through the coolant passages so that the plastic is injected into the hot mold to completely fill the cavity without causing any flow marks or visible net lines. Once the cavity is filled, then the hot fluid is substituted for a coolant to chill the mold and solidify the part. The alternate heating cooling cycles are fairly expensive increasing cycle time and cause a great deal of thermal stress on the mold structure and frequently only heat cycles the cavity portion of the mold.

An alternative way of heating the mold prior to injection is to open the mold and expose the mold cavity surface to a induction heat source. Once the mold cavity surface is sufficiently hot, the heat source is removed and the mold closed and injection is commenced. The use of an induction heater, again is expensive, creates significant space issues in the tightly confined mold area and significantly adds to cycle time and only applied to a relatively flat surface with shallow depth. Induction heating is frequently only applied to the cavity portion.

There have been some efforts to utilize high pressure steam to preheat a mold cavity. While steam is relatively inexpensive and can rapidly heat the mold cavity, problems have resulted from the condensate being trapped in the mold effecting part quality. This method did not remedy the sink problem over ribs and bosses. Accordingly, steam heating has not been readily adopted by the industry.

SUMMARY OF THE INVENTION

A system and method are provided for molding a solid plastic part utilizing a mold having at least a core portion and a cavity portion which define a mold cavity therebetween. With the mold closed, pressurized steam is circulated through the mold cavity to heat the interior surface of the mold cavity, both core and cavity portions. Once the mold cavity surface has reached the desired temperature, the pressurized steam is vented. In a preferred embodiment, hot dry air is blown through the mold cavity to expel condensate in the mold. And optionally, in a preferred embodiment, the vacuum sources are coupled to the mold cavity to evaporate any remaining condensate in the mold. Once the condensate has been sufficiently removed, a fluid plastic, or plastic-gas foam mixture, is injected into the mold to substantially fill the mold cavity. After the plastic has completely injected into the mold cavity a pressurized fluid, preferably a gas, is introduced in the mold through a port or ports in the mold core portion to bias the part being formed into engagement with the mold cavity portion as the part cools. Once the part is cooled sufficiently to be stable, the mold is opened and the part is removed. The mold is then closed and the pressure steam heating step resumes for the next part.

The system for molding solid plastic parts as previously described, is made up of a mold having core and cavity portions defining an internal cavity. The mold is provided fluid plastic by the fluid injection gate in communication with the mold cavity and connectable to a source of pressurized fluid. At least one of the mold portions is provided with a steam inlet and at least one of the mold portions is provided with a steam outlet. The core portion of the mold is further provided with an inlet for pressurized fluid to enable the part to be biased against the cavity portion of the mold during cooling in order to eliminate shrink distortion. Both mold portions are provided with liquid cooled passageways so that the mold can be cooled. Steam input is provided by a connection to the mold steam inlet passage which includes a flow valve for regulating the flow of steam to be provided by a steam source. A steam trap is connected to the mold steam outlet as further provided with a flow control valve to regulate the flow of steam between the mold and the steam path and in order to maintain the desired steam pressure in the mold cavity during heating. A flow control for pressurized fluid connectable to the pressurized fluid input includes a flow control valve for regulating the time and pressure of the pressurized fluid supplied to exert pressure on the core side of the part being formed. A system controller cooperates with the steam supply valve, the steam exhaust valve that regulates steam flow through the mold during the heating cycle in order to rapidly heat the walls of the mold defining the mold cavity prior to the injection of fluid plastic from the plastic source.

In a preferred embodiment, the apparatus further includes a source of hot dry air coupled to the steam input of the mold regulated by hot air valve operated by the controller to dry the mold cavity after steam heating. Preferably, a vacuum source is coupled to the mold steam outlet regulated by a vacuum valve controlled by the controller so that any remaining moisture in the mold cavity can be evaporated prior to the injection of plastic into the mold.

BRIEF DESCRIPTION OF THE DRAWINGS

FIG. 1 is a schematic view of the system used in the practice of the method;

FIG. 2a is an exploded detailed view of the steam collection manifold;

FIG. 2b is an alternative embodiment with steam collection port in the mold cavity;

FIGS. 5a and 5b are front and rear perspective views of a complex part made using the system and method;

FIG. 6 is a cross-sectional side elevational view of a mold assembly for making the part of FIGS. 5a and 5b; and FIG. 7 is a cross-sectional view of the mold assembly of FIG. 6 taken along section line 7-7.

DETAILED DESCRIPTION

Figure 3:
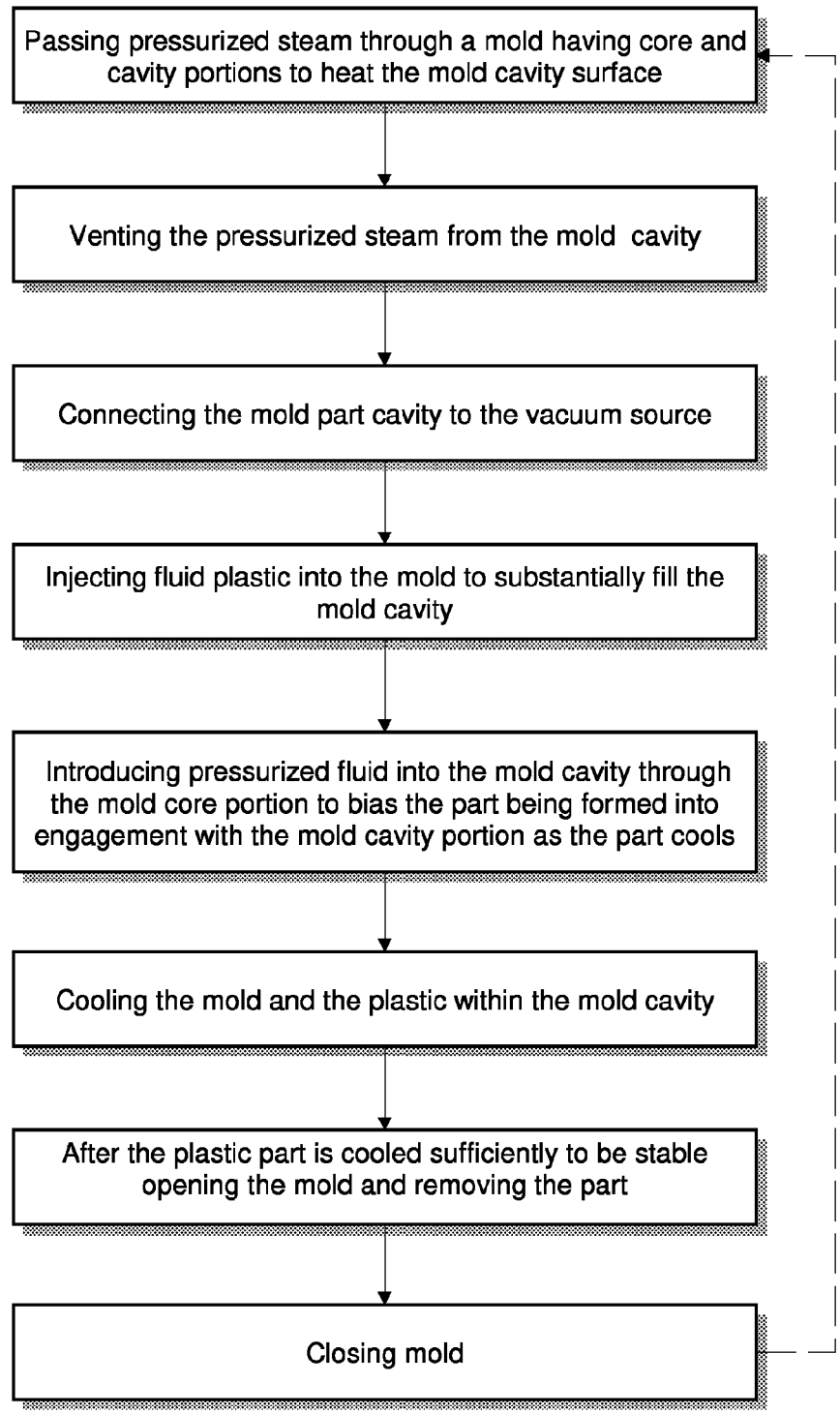
FIG. 3 is a flow chart of the method.

A preferred embodiment of a molding system is illustrated in FIGS. 1, 2, schematically. A mold 10 is provided having a core portion 12 and a cavity portion 14 which define an internal, hollow mold cavity 16 therebetween. Two mold portions are movable relative to one another between a closed position illustrated and an open position in which the part formed in the mold cavity can be removed. The mold core portion 12 is moved between the open and closed position by cylinder 18 associated with the molding machine. At least one of the mold portions is provided with a fluid plastic injection gate 20 connected to an injection nozzle 22 which is supplied heated fluid plastic by a plastic source 24 associated with the injection molding machine in which the mold is mounted. Mold portions 12 and 14 are provided with an internal cooling passage 26 so that mold coolant system 28 can circulate coolant through both the mold cavity portion and the core portion to cool the mold during use. Mold coolant system 28 must be sufficient to maintain to mold temperature just below the fluidification temperature of the plastic to be molded.

A large, relatively thin mold cavity 16 is shown for illustration purposes. In order to enable the plastic flow throughout the mold cavity without having the plastic to begin to solidify before the injection is complete, it is desirable to heat the mold cavity. A steam inlet passage 30 is provided in one of the mold portions and is connected to a steam source 32 via a fast acting, remotely operated valve 34. A steam outlet passage 36 is provided in one of the mold portions to enable steam to exit the mold cavity. During a heating step, the steam valve 34 is opened to allow steam to flow into the mold through inlet 30 and out of the mold cavity through steam port 36 to steam trap 38. A fast acting, remotely operated valve 40 connects steam port 36 to steam trap 38. A pressure regulator valve 42 is connected in parallel with the fast opening valve 40. During the steam heating operation, steam flows from the steam source through the valve 34 through the mold cavity and into the steam trap at a pressure which is regulated by valve 42.

When the heating step is complete, the steam is shut off at the source via valve 34 and fast opening valve 40 opens while the cavity is vented and the pressure of the steam to blow it out. In the mold structure illustrated in FIG. 1, the mold is provided with a steam collection manifold 44 which surrounds the mold cavity. Steam collection manifold 44 is formed by machining a groove in at least one of the mold portions. The mold portions are sealed by a seal 46 located outboard of the steam collection manifold 44. Steam is capable of leaking between the mold cavity 16 and the steam collection manifold 44 in a conventional manner through a series of nicks ("nics") or vents made in the mold which are large enough to allow gas to escape, yet small enough to freeze any plastic trying to escape. Enlargement of the steam collection manifold 44 is illustrated in FIG. 2a.

As an alternative to the steam collection manifold structure, a solenoid operated steam port may be provided in the mold as illustrated in FIG. 2b. A valvepintle 48 is moved axially, a solenoid or hydraulic cylinder not shown, shiftable between a closed position illustrated and an open position in which steam can flow from cavity 16 out through steam exit port 36. The steam valvepintle 48 is preferably located in a lower most region of the cavity where condensate would naturally collect. Depending on the mold geometry, more than one steam pintle may be necessary. In both FIGS. 2a and 2b embodiments, the pressure of the steam inside the mold during the steam heating step must be maintained at a relatively high pressure by pressure regulator valve 42 in order to maintain the desired temperature within the mold. Preferably, the temperature of the steam within the mold will be 250 to 350 degrees F. corresponding to a pressure easily calculated via a steam table. Ideally, the temperature in the mold surface cavity and core are 50 to 175 degrees above the melting temperature of the plastic to be injected. The length of time the steam is injected and the quantity of steam used will necessarily be determined experimentally via trial and error for each part. A thermocouple located close to the surface of the cavity or core can signal a stop of the steam inlet.

A desire is to heat the mold sufficiently so that the mold will be hot enough to fully inject the plastic shot without having premature skin formation on the cavity or core sides of the mold. If you heat only one side of the mold in the cavity and the core is left at a temperature below the distortion point on the plastic, then you get a staggered flow. A minimal amount of steam is desired since this steam heating step increases cycle time and adds to the heat necessary for the cooling system to remove from the mold portions. After the mold is heated, the steam is shut off and the cavity is blown down by opening the quick operating steam valve 40 allowing the steam to flow into the steam trap 38. Condensate collected in the steam trap may be recycled in a boiler to make new steam while the remaining dry steam is vented to the atmosphere.

The entire mold cavity should be sealed to prevent steam from leaking from the mold and to prevent mold components from rusting. Preferably a sealed nozzle will be used such as the hot runner nozzles sold by Incoe Corporation USA 1740 East Maple Road Troy, Mich., which are generically referred as "hot drops". Other openings into the mold cavity should also be sealed with "O" rings or the like such ejector pins, core pins, lifters and slides.

If the mold cavity surface is hot enough and sufficiently self-draining, it may be possible to immediately inject plastic from the source 24 through the injection nozzle 22 and gate 20 into the mold cavity after steam blow down. Preferably, prior to injecting plastic, a source of hot dry air 48 is connected to inlet 30 by solenoid valve 50 to dry any remaining condensation on the walls of the mold cavity. Hot dry air can be dumped to the steam trap through valve 40 or dumped through to atmosphere through an alternative solenoid operated valve not shown.

In a preferred embodiment of the apparatus, a vacuum source 52 is provided which may be connected to the outlet port 36 by a solenoid operated valve 54. The mold can either be sealed in which case the vacuum source will provide sufficient vacuum to boil off any condensate in the mold, or very small amounts of hot dry air can continue to flow through the mold with the vacuum pressure in the mold maintained by vacuum regulator 55. After the completion of a very brief vacuum cycle, sufficient to remove any remaining moisture from the mold, the plastic injection step begins. The vacuum drying step can be used alone or in combination with a hot pressurized drying step. In either event, the drying step or steps should be very brief so that the temperature of the wall of the mold cavity will not be cooled below desired injection temperature. Preferably, the hot dry air drying step is carried out using hot dry air at a pressure of 25 to 50 psi measured at the mold inlet and preferably, the vacuum drying step is achieved using a vacuum measured in the mold at 20 to 26 I.O.M. pressure.

In an alternative embodiment the mold maybe provided with a ceramic coating 69 on at least the cavity portion 14 of the mold cavity 16 as shown in FIG. 2b. A porcelain or ceramic coating 69 acts as an insulator reducing the rate of heat transfer between the plastic part being formed and the mold cooling system. The ceramic coating preferably is between 0.003 and 0.015 inches thick. Immediately after the plastic has been injected the mold a pressurized fluid such as nitrogen can be introduced into the mold cavity via port 56, as described previously, to bias the part into engagement with the ceramic coated cavity portion of the mold. To insure even plastic flow during injection of the plastic the core may be coated with a layer of porcelain or a ceramic material.

Once the plastic injection process begins, the mold is rapidly filled substantially to capacity. When using a full shot molding process, the mold pressure will be maintained by the plastic source for the time sufficient for the plastic within the gate 20 to freeze. Once the gate freezes, the plastic source can no longer feed plastic into the mold cavity as the plastic charge begins to cool and shrink. In order to avoid shrink marks on the cavity side surface of the part, pressurized gas such as nitrogen is applied to the core side through the pressurized fluid port 56 from a pressurized gas source 58. The gas port 56 can be opened as soon as injection of plastic through the gate 20 stops or as late as 1 to 3 seconds after injection stops depending on the part configuration. Injection of gas should begin while the plastic is hot and before part sufficient shrinkage due to cooling has occurred to cause the part surface to pull away for the cavity side of the mold surface.

When using a full shot molding process, the mold is initially filed 100-103% full and the pressurized gas is used to force the part into contact with the cavity side of the mold by filling out the mold as the plastic cools and shrinks. When using a short shot molding process, the mold is initially filed 95-99% full and the pressurized gas is used to fill out the mold and force the part into contact with the cavity side of the mold. The gas pressure is maintained at a desired level by a regulator valve 60 and the flow of gas to fluid inlet port 56 is regulated by an on/off solenoid valve 62. By maintaining the external fluid pressure on the core side of the part as it is formed, the part is urged into intimate contact with the cavity portion of the mold, preventing any visible shrink marks, weld lines or sink marks. The external fluid pressure is maintained on the part as it is cooled. Once the part is cooled sufficiently to be dimensionally stable, the pressure source is isolated and the mold is opened so that the part can be ejected.

It should be appreciated that a plastic-gas mixture or a plastic with a chemical blowing agent additive could be used in the above system. The resulting plastic foam part can have a plastic to gas ratio selected to achieve one or more of the desired part or process properties: improved part surface finish, mold weight reduction, part weight reduction, lower injection and clamp pressure, increase in allowable rib dimensions, decreased energy usage and reduced part warpage.

The operation and timing of the various devices making up the system are regulated by preheating controller 64 which can be a computerized controller or a conventional PLC type device. The preheating controller works in cooperation with the standard injection molding machine controller which controls the timing of the injection of the plastic charge and the solenoid valve 62 which supplies pressurized gas to the cavity. Preferably, a temperature sensor 66 is provided and associated with a controller 64 so the temperature in the mold near the mold cavity surface can be measured using a temperature probe 68 as shown FIGS. 2a and 2b.

The method of operation of the molding apparatus is further illustrated in flow chart form in FIG. 3. The closed mold is first heated by passing pressurized steam through the mold cavity to heat the cavity surface. The steam is vented and the mold cavity is connected to a vacuum source for removing residual condensate moisture from the steam. Once dried sufficiently, fluid plastic is injected into the mold to substantially fill the mold cavity. Once the plastic has been introduced into the mold cavity a pressurized fluid is introduced into the mold cavity core portion to bias the part being formed into engagement with the mold cavity portion as the part continues to cool. After the part is cooled sufficiently to be stable, the mold is opened and the part removed whereupon the mold is closed once again and a new cycle commences.

Figure 4:
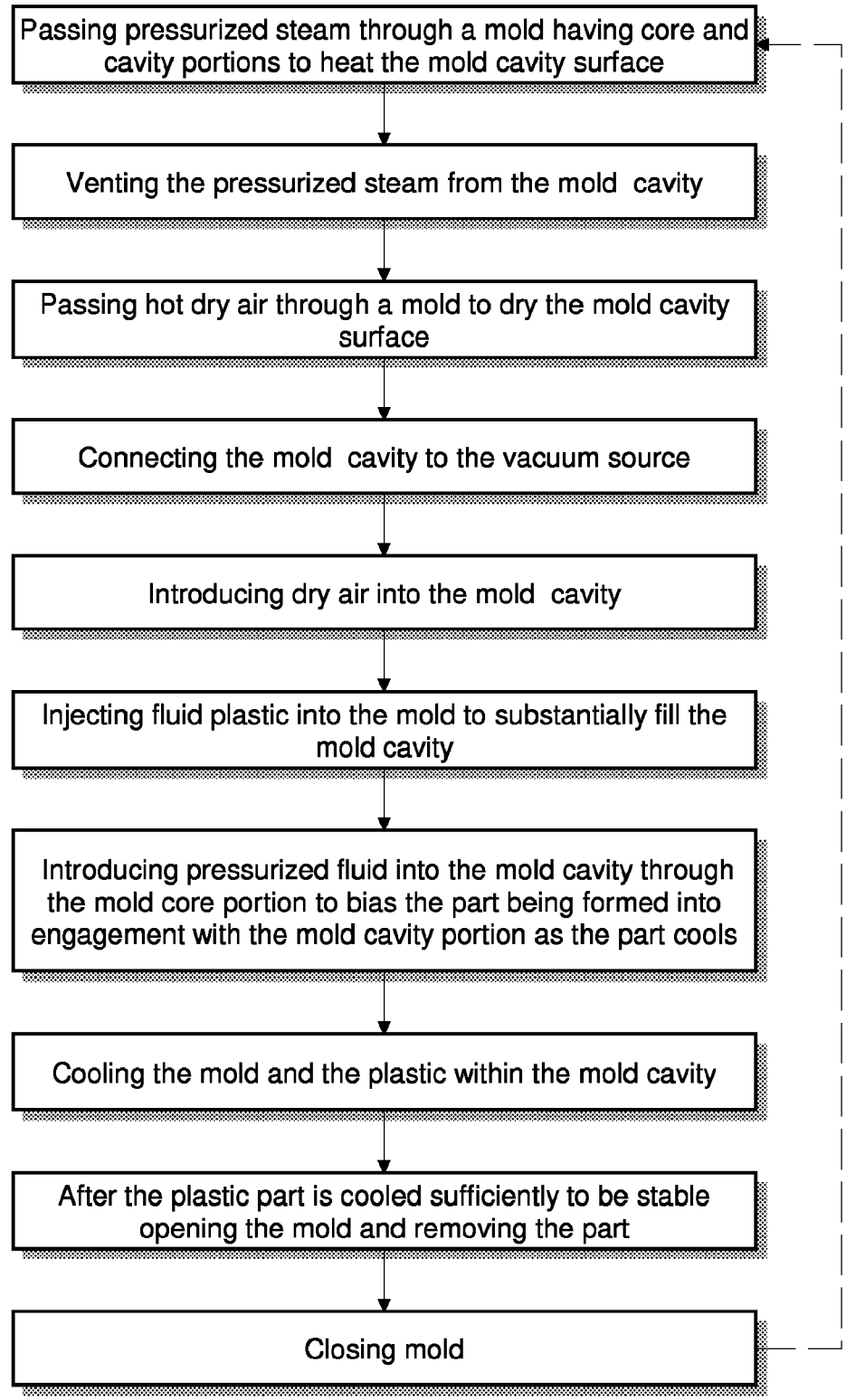
FIG. 4 is a flow chart of an alternative method.

In FIG. 4, an alternative method is illustrated in the flow chart format. However, in this method, after the steam is vented from the mold cavity, hot dry air is circulated through the mold to remove condensate whereupon the mold cavity is connected to a vacuum source. Hot dry air is then introduced into the mold cavity to vent the vacuum prior to the commencement of injecting plastic into the mold.

FIGS. 5a and 5b illustrate the front and back perspective views of a complex part 70 made utilizing a variation of the previously described apparatus and method. Complex part 70 has a thin panel section 72 with a smooth show side visible in FIG. 5a and an opposed side visible in FIG. 5b. The outer periphery of the thin panel 72 is reinforced by a rectangular frame made up of a pair of hollow rail members 74 and a pair of solid rib members 76. The complex part 70 has a very thin lightweight panel 72 with a show side illustrated in FIG. 5a and a core side illustrated in FIG. 5b.

Part 70 is formed in mold 78 illustrated in FIG. 6. Mold 78 is provided with a core portion 80 and a cavity portion 82 defining an internal cavity 84 therebetween. Internal cavity 84 has a relatively thin center section corresponding to thin panel 72 and a large cross-sectional elongate cavity corresponding to the hollow rails 74. Fluid plastic is introduced into the internal cavity 84, the mold through a nozzle connected to a plastic source in a manner similar to the FIG. 1 embodiment. The cavity is initially substantially filled and preferably an external fluid pressure source is introduced into the core portion of the mold to bias the thin panel member 72 of the part being formed into compliance with the cavity portion of the mold 82 as previously described with reference to the FIG. 1 embodiment.

Mold 78 is provided with a pair of spill cavities 88, one of which is illustrated in FIG. 7, a cross-sectional view of mold 78. Spill cavity 88 is connected to the large hollow section 90 of the mold which forms the hollow rail 74 of part 70. A narrow passage connects spill cavity 88 to hollow section 90 which is regulated by a spill valve 92. When plastic is initially injected into the mold cavity, the spill cavity is empty and the spill valve 92 is closed. After a thin layer of plastic along the peripheral wall of the hollow section 90 of the mold cavity has cooled, a second fluid valve 94 is opened and a second pressurized fluid source 96 is connected to a second fluid port 98 and the end of the hollow section 90 of the mold. Spill valve 92 is then opened allowing the second pressurized fluid source 96 to displace fluid plastic from the center of the hollow section 90 into the spill cavity forming a hollow rail section 74 as illustrated. Once the part is cooled sufficiently, and after the first and second pressurized fluid sources have been disconnected, and the hollow rails vented to atmosphere, mold is opened and part 70 is removed. The plastic portion removed from the spill cavity 88 is trimmed off for subsequent recycling.

It should be appreciated that mold 78 and the associated molding system has all of the features of mold 10 described with reference to the FIG. 1 embodiment. Accordingly mold 78 will have a steam heating system with a hot air blow down feature and a steam trap and vacuum source as previously described. These features are not shown in the mold 78 in FIGS. 6 and 7 in order to keep the drawings simple for illustration purposes.

It should be appreciated that a system and method described for steam heating a mold enables parts having a large thin section to be molded having a very high show surface free of flow marks and sinks. This technology can be combined with a spill cavity and internal gas assist spill molding process to achieve parts having both large thin panel sections and thick hollow structural members.

It should be further appreciated that in the FIGS. 6 and 7 embodiment, portions of the mold corresponding to the thin panel section can be coated with a ceramic material 70 such as porcelain, as described previously with reference to FIG. 2b, in order to prevent premature cooling of the fluid plastic in the thin section of the mold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of molding a plastic part utilizing a mold having at least a core portion and a cavity portion which define a mold cavity there between, the method comprising:
   passing pressurized steam through a mold to heat an internal surface defining a mold cavity;
   venting the pressurized steam from the mold cavity;
   injecting fluid plastic into the mold to fill the mold cavity to a desired fill level;
   introducing a first pressurized fluid into the mold cavity through a port in the mold core portion to bias the part being formed into engagement with the mold cavity portion as the part continues to cool;
   cooling the mold and the plastic within the mold cavity; and
   after the part has cooled sufficiently to be stable, opening the mold and removing the part.

2. The method of claim 1 further comprising prior to connecting the mold cavity to a vacuum source, passing pressurized dry air through the mold in order to remove condensate from the mold cavity.

3. The method of claim 2 wherein after the pressurized steam in the mold cavity has been vented, connecting the mold cavity to a vacuum source to evaporate any condensate remaining in the mold cavity.

4. The method of claim 1 wherein after the pressurized steam in the mold cavity has been vented, connecting the mold cavity to a vacuum source to evaporate any condensate remaining in the mold cavity.

5. The method of claim 1 wherein the steam pressure in the mold during the steam heating step is maintained between 25 and 165 psi.

6. The method of claim 1 wherein the pressure of the steam in the mold during the heating step is maintained sufficiently high so that the steam introduced into the mold cavity is between 250 and 350 degrees F.

7. The method of claim 1 wherein the pressure of the steam in the mold during the heating step is maintained at a temperature which exceeds the heat distortion temperature of the plastic to be injected into the mold by 50 to 175 degrees F.

8. The method of claim 1 wherein the mold core and cavity portions are liquid cooled by a liquid having a temperature which is below the solidification temperature of the plastic to be molded.

9. The method of claim 8 wherein the mold cooling liquid continues to be circulated through the mold during the steam heating step.

10. The method of claim 1 wherein the mold cavity is filled with fluid plastic having a volume of 95 to 99.9% of the volume of the mold cavity during the injecting step.

11. The method of claim 1 wherein the mold cavity is filled with fluid plastic having a volume of 100 to 103% of the volume of the mold cavity during the injecting step.

12. The method of claim 1 wherein the part being formed has a thin region and a relatively thick region, the method further comprising, after the step of partially cooling the plastic within the mold cavity, connecting an end of the thick region mold cavity to a spill cavity formed while introducing a second pressurized fluid into the mold cavity at location remote from the spill cavity connection to displace fluid plastic from the mold cavity thick region into the spill cavity in order to form a hollow section in the part.

13. A method of molding a solid plastic part utilizing a mold having at least a core portion and a cavity portion which define a mold cavity there between, and a liquid cooling system, the method comprising:
   passing pressurized steam through a mold cavity to heat the surface of the mold cavity;
   venting the pressurized steam from the mold cavity;
   passing pressurized dry air through the mold cavity in order to remove condensate from the mold cavity;
   connecting the mold cavity to a vacuum source in order to remove any remaining condensate from the mold cavity;
   injecting fluid plastic into the mold to fill the mold cavity to the desired fill level;
   introducing pressurized fluid into the mold cavity through a port in the mold core portion to bias the part being formed into engagement with the mold cavity portion as the part continues to cool;
   cooling the mold and the plastic within the mold cavity; and
   after the part has cooled sufficiently to be stable, opening the mold and removing the part.

14. The method of claim 13 wherein the steam pressure in the mold during the steam heating step is maintained between 25 and 165 psi.

15. The method of claim 13 wherein the pressure of the steam in the mold during the heating step is maintained at a temperature which exceeds the heat distortion temperature of the plastic to be injected into the mold by 50 to 175 degrees F.

16. The method of claim 13 wherein the mold cooling liquid continues to be circulated through the mold during the steam heating step.

17. A molding apparatus for molding a hollow plastic product, comprising:
   a mold having at least two cooperating portions, a core portion and a cavity portion which define a mold cavity there between, a fluid plastic injection gate in communication with the mold cavity connectable to a source of pressurized fluid plastic, wherein one of the mold portions is provided with a steam inlet and at least one of the mold portions is provided with a steam outlet, the core portion of the mold further provided with an inlet for pressurized fluid so that the part may be biased against the cavity portion of the mold during further cooling in order to minimize shrink distortion on the cavity side of the part, with the core and cavity portions of the mold are further provided with liquid coolant passages to cool the mold;
   a steam input connected to a mold steam inlet passage and provided with a flow valve for regulating the flow of steam to be provided by a steam source to the mold cavity;
   a steam trap connected to a mold steam outlet by a steam conduit further provided with a flow control valve to regulate the flow of steam between the mold and the steam trap in order to maintain the desired steam pressure within the mold cavity;
   a flow control for pressurized fluid connectable to the pressurized fluid input in the mold, the flow control including a flow control valve to regulate the timing and pressure of the pressurized fluid supplied to be exerted on the core side of the part being formed; and a controller cooperating with the steam supply valve and the steam exhaust valve to regulate the flow of steam through the mold cavity during a heating cycle in order to rapidly heat the walls of the mold defining the mold cavity prior to the injection of fluid plastic from a plastic source into the mold cavity.

18. The apparatus of claim 17 further comprising a source of hot dry air coupled to the steam input of the mold, regulated by a hot air valve interposed between the hot dry air source and the steam input in the mold, the hot dry air valve being regulated by the controller to dry the mold cavity prior to injection of fluid plastic into the mold cavity.

19. The apparatus of claim 17 wherein the surface of the mold cavity defined by the cavity portion of the mold is coated with a thin layer of ceramic material.

20. The apparatus of claim 19 wherein the surface of the mold cavity defined by the core portion of the mold is coated with a thin layer of porcelain or ceramic material.

21. The method of claim 1 wherein the plastic injected into the mold cavity is mixed with a gas.

22. The method of claim 21 wherein the plastic portion of the plastic and gas mixture injected fills the mold cavity 75 to 94%.

23. The method of claim 21 wherein the plastic injected into the mold cavity is provided with a chemical blowing agent.

24. The method of claim 23 wherein the plastic portion of the plastic and gas mixture injected fills the mold cavity 75 to 94%.

* * * * *